US009206340B2

(12) United States Patent
Matsumoto et al.

(10) Patent No.: US 9,206,340 B2
(45) Date of Patent: Dec. 8, 2015

(54) EASILY DISMANTLABLE ADHESIVE COMPOSITION AND EASILY DISMANTLABLE ADHESIVE TAPE

(75) Inventors: Akikazu Matsumoto, Kawachi-Nagano (JP); Eriko Sato, Sakai (JP); Akinori Morino, Kita-Adachi-gun (JP); Koujirou Tanaka, Izumiotsu (JP)

(73) Assignees: DIC CORPORATION, Tokyo (JP); OSAKA CITY UNIVERSITY, Osaka-shi (JP)

( * ) Notice: Subject to any disclaimer, the term of this patent is extended or adjusted under 35 U.S.C. 154(b) by 0 days.

(21) Appl. No.: 14/122,589

(22) PCT Filed: Jun. 1, 2012

(86) PCT No.: PCT/JP2012/064295
§ 371 (c)(1),
(2), (4) Date: Jan. 2, 2014

(87) PCT Pub. No.: WO2012/165619
PCT Pub. Date: Dec. 6, 2012

(65) Prior Publication Data
US 2014/0114016 A1 Apr. 24, 2014

(30) Foreign Application Priority Data

Jun. 2, 2011 (JP) .................................. 2011-124509
Sep. 29, 2011 (JP) .................................. 2011-215492

(51) Int. Cl.
*C08F 290/06* (2006.01)
*C08F 118/02* (2006.01)
(Continued)

(52) U.S. Cl.
CPC .............. *C09J 133/14* (2013.01); *C08F 293/00* (2013.01); *C09J 7/00* (2013.01); *C09J 133/04* (2013.01);
(Continued)

(58) Field of Classification Search
CPC .. C09J 153/005; C09J 133/04; C09J 133/066; C09J 133/14; C09J 133/12; C09J 2453/00; C09J 2205/102; C09J 2433/00; C09J 7/00; C08F 293/00; C08K 5/42
USPC .......................................... 524/558; 526/319
See application file for complete search history.

(56) References Cited

U.S. PATENT DOCUMENTS 6,703,073 B2   3/2004   Husemann et al.
6,806,320 B2   10/2004  Everaerts et al.
(Continued)

FOREIGN PATENT DOCUMENTS

CN       1278544 A    1/2001
EP       2186867 A1   5/2010
(Continued)

OTHER PUBLICATIONS

U.S. Appl. No. 14/122,299, filed Nov. 26, 2013.
(Continued)

*Primary Examiner* — William Cheung
(74) *Attorney, Agent, or Firm* — Westerman, Hattori, Daniels & Adrian, LLP

(57) ABSTRACT

An easily dismantlable adhesive composition is provided containing: an acrylic polymer; and either an acid catalyst or an acid generator, the acrylic polymer containing: as monomer components, a carboxyl-precursor-group-containing-(meth)acrylate monomer; an n-butyl acrylate; and a polar-group-containing monomer, the content of the polar-group-containing monomer being 5 to 30% by mass, relative to the total mass of the monomer components composing the acrylic polymer, makes it possible to realize favorable adhesion- and dismantling properties and favorable delamination at an interface between an adherend and a substrate or an interface between an adhesive agent layer and an adherend when dismantled.

16 Claims, 6 Drawing Sheets

MEASUREMENT RESULT OF PEEL DISTANCE / PEEL STRENGTH (EXAMPLE 1)

(51) Int. Cl.
| | |
|---|---|
| *C09J 133/14* | (2006.01) |
| *C09J 133/04* | (2006.01) |
| *C08F 293/00* | (2006.01) |
| *C09J 7/00* | (2006.01) |
| *C09J 133/12* | (2006.01) |
| *C09J 153/00* | (2006.01) |
| *C09J 133/06* | (2006.01) |
| *C08K 5/42* | (2006.01) |

(52) U.S. Cl.
CPC ............ *C09J 133/066* (2013.01); *C09J 133/12* (2013.01); *C09J 153/005* (2013.01); *C08K 5/42* (2013.01); *C09J 2205/102* (2013.01); *C09J 2433/00* (2013.01); *C09J 2453/00* (2013.01)

(56) References Cited

U.S. PATENT DOCUMENTS

| | | |
|---|---|---|
| 2004/0009113 A1 | 1/2004 | Sion |
| 2004/0028895 A1 | 2/2004 | Yamakami et al. |
| 2007/0265404 A1 | 11/2007 | Yamago et al. |
| 2009/0299008 A1 | 12/2009 | Yamago et al. |
| 2012/0070660 A1 | 3/2012 | Miyazaki et al. |
| 2012/0196952 A1 | 8/2012 | Suzuki |

FOREIGN PATENT DOCUMENTS

| | | | |
|---|---|---|---|
| JP | 56-500889 | A | 7/1981 |
| JP | 09-137145 | A | 5/1997 |
| JP | 10-140093 | A | 5/1998 |
| JP | 11-143079 | A | 5/1999 |
| JP | 2001-270912 | A | 10/2001 |
| JP | 2002-167566 | A | 6/2002 |
| JP | 2003-313527 | A | 11/2003 |
| JP | 2004-043732 | * | 2/2004 |
| JP | 2004-043732 | A | 2/2004 |
| JP | 2004-323693 | A | 11/2004 |
| JP | 2005-023205 | A | 1/2005 |
| JP | 2006-225524 | A | 8/2006 |
| JP | 2006-299278 | A | 11/2006 |
| JP | 2007-186606 | A | 7/2007 |
| JP | 2008-291216 | A | 12/2008 |
| JP | 2009-149877 | A | 7/2009 |
| JP | 2010-070597 | A | 4/2010 |
| JP | 2010-241961 | A | 10/2010 |
| JP | 2012-126879 | A | 7/2012 |
| WO | 81/00309 | A1 | 2/1981 |
| WO | 2004/014818 | A1 | 2/2004 |
| WO | 2006/001496 | A1 | 1/2006 |
| WO | 2006/062255 | A1 | 6/2006 |
| WO | 2010/126123 | A1 | 11/2010 |

OTHER PUBLICATIONS

U.S. Appl. No. 14/122,476, filed Nov. 26, 2013.
U.S. Appl. No. 14/124,167, filed Dec. 5, 2013.
International Search Report of PCT/JP2012/064300, mailing date of Aug. 14, 2012.
International Search Report of PCT/JP2012/064303, mailing date of Aug. 14, 2012.
International Search Report of PCT/JP2012/064295, mailing date of Aug. 21, 2012.
International Search Report of PCT/JP2012/064485, mailing date of Sep. 4, 2012.
Office Action dated Dec. 18, 2014, issued in related Chinese Patent Application No. 201280026905.5, with English translation (11 pages).
Benedek et al., "Technology of Pressure-Sensitive Adhesives and Products", CRC Press, 2009, p. 7-4, cited in US Office Action dated Nov. 17, 2014 (3 pages).
Extended European Search Report dated Oct. 1, 2014, issued in corresponding EP Application No. 12792020.5 (6 pages).
Extended European Search Report dated Oct. 1, 2014, issued in corresponding EP Application No. 12793415.6 (6 pages).
Extended European Search Report dated Oct. 1, 2014, issued in corresponding EP Application No. 12793071.7 (6 pages).
US Office Action dated Nov. 17, 2014, issued in corrresponding U.S. Appl. No. 14/122,476 (14 pages).
Michalak et al., "DFT Studies on the Copolymerizationof a-Olefins with Polar Monomers: Ethylene-Methyl Acrylate Copolymerization Catalyzed by a Pd-Based Diimine Catalyst", J. Am. Chem. Soc., 2001, vol. 123, No. 49, pp. 12266-12278, Cited in Office Action dated May 28, 2015, issued in U.S. Appl. No. 14/122,476.
Office Action dated May 28, 2015, issued in U.S. Appl. No. 14/122,476, (11 pages).
Non-Final Office Action dated Jul. 10, 2015, issued in U.S. Appl. No. 14/122,299 (20 pages).
Communication pursuant to Rule 164(1) EPC dated May 20, 2015, issued in counterpart European patent application No. 12796812.1 (4 pages).
Iizawa et al., "Thermal acid-catalyzed deesterification of poly(t-butyl acrylates) using thermo-generated acid catalysts", Kobunshi Ronbunshu, Aug. 1998, pp. 490-496, vol. 55, No. 8, with English abstract; cited in European Communication dated May 20, 2015.
Yavuz et al., "Electrorheological Properties of Suspensions Prepared from Poly(Li-tert-butyl methacrylate) Ionomer", Turkish Journal of Chemistry, 2004, pp. 587-601; cited in European Search Report dated May 20, 2015.
U.S. Office Action issued Sep. 29, 2015 for related U.S. Appl. No. 14/124,167 (12 pages).

* cited by examiner

EASILY DISMANTLABLE ADHESIVE COMPOSITION AND EASILY DISMANTLABLE ADHESIVE TAPE

This application is the National Stage of PCT International Application No. PCT/JP2012/064295 filed on Jun. 1, 2012, which claims priority under 35 U.S.C. Section 119(a) to Japanese Patent Application No. JAPAN 2011-124509, filed Jun. 2, 2011, and Japanese Patent Application No. 2011-215492, filed Sep. 29, 2011, all of which are hereby expressly incorporated by reference.

TECHNICAL FIELD

The present invention relates to an easily dismantlable adhesive tape which enables easy dismantling of attachment with an adherend or fixation of members therebetween after the adhesive tape is attached to the adherend or used to fix the members therebetween and then a certain period of time has elapsed, and an easily dismantlable adhesive composition which composes the easily dismantlable adhesive tape.

BACKGROUND OF THE INVENTION

An adhesive tape is used as a reliable adhesive joint member having excellent workability to fix members therebetween, provisionally fix members therebetween, label product information, or the like, in industrial fields such as office automation equipment, IT—home electric appliances, or automobiles. In recent years, the demand for recycling and reusing used products has increased in various industrial fields such as home electrical appliances or automobiles from the standpoint of protection of the earth's environment. In the case where various products are recycled or reused, although adhesive tapes used to fix members or as labels are required to be delaminated therefrom, the adhesive tapes are used on various positions in the products, and therefore a decrease in the operation cost by performing a simple removing process is demanded.

As an easily dismantlable adhesive tape, an adhesive member having at least two adhesive layers, the adhesion forces of which are different from each other, is disclosed, for example (see Patent Document 1). The adhesive tape is an adhesive member which realizes both strong fixation of an adherend and easy dismantling at a weakly-adhesive layer serving as the delamination face by joining the adherend via the weakly-adhesive layer of the adhesive member including adhesive layers with a superposed structure. However, the adhesive member has a problem in that the production cost thereof increases, because plural adhesive agent layers are essential components thereof. In addition, since the structure of the adhesive member allows bonding with an adherend via the weakly-adhesive layer, there is a limitation on an increase in the adhesion force thereof, and it is difficult for the adhesive member to be used to strongly fix members. In particular, there is a case where the adhesive tape is required to exhibit favorable adhesion properties under high temperature, because the adhesive tape is often used under circumstances where heat is applied thereto when the adhesive tape is used to fix members in office automation equipment, IT—home electric appliances, automobiles, or the like.

As another easily dismantlable adhesive composition, an adhesive composition containing an aliphatic polyester is disclosed (see Patent Document 2). The adhesive composition is disclosed to be easily delaminable due to hydrolysis-promoting action of polycaprolactone when immersed in hot water in a delaminating process. However, since the adhesive composition requires to be immersed in hot water when delamination is performed, the equipment cost is high when the adhesive composition is applied to a part having a large size to be dismantled, and the adhesive composition cannot be applied to parts to which water cannot be applied when reused, such as electronic parts.

Even if the adhesion force of an adhesive tape significantly decreases when dismantling is performed, there is a case where removing of a remaining adhesive agent layer is required to delaminate the adhesive tape from an adherend or a substrate, the remaining adhesive agent layer being caused by cohesion failure in the adhesive agent layer occurring when dismantling is performed, and therefore the workability of dismantling a large quantity of industrial products is poor.

An adhesive composition containing a block copolymer obtained by preparing an acrylic copolymer having a carboxyl precursor-group (—COOt-butyl) in an acrylic polymer block and then converting the carboxyl precursor-group to a carboxyl group is disclosed as an adhesive composition using an acrylic block copolymer (see Patent Document 3). Although the adhesive composition is obtained by preparing an acrylic copolymer having a t-butyl group in a side chain thereof as a carboxyl precursor-group, the t-butyl group does not remain in the obtained adhesive composition, and no dismantling properties are exhibited.

DOCUMENTS OF RELATED ART

Patent Documents

Patent Document 1: Japanese Unexamined Patent Application, First Publication No. H10-140093
Patent Document 2: Japanese Unexamined Patent Application, First Publication No. H9-137145
Patent Document 3: Japanese Patent Application Laid-Open No. 2002-167566

DISCLOSURE OF THE INVENTION

Problems to be Solved by the Invention

In order to solve the above problems, the present invention aims to provide an easily dismantlable adhesive tape which enables favorable adhering to an adherend or fixation of members therebetween, and which enables easy dismantling by performing heating or energy-line-irradiation without using water such as hot water when dismantling is performed, and an adhesive composition which enables formation of the easily dismantlable adhesive tape.

In addition, the present invention also aims to provide an easily dismantlable adhesive tape which is excellent in dismantling properties and exhibits excellent adhesion properties under hot temperature, and an adhesive composition which enables formation of the easily dismantlable adhesive tape.

In addition, the present invention further aims to provide an easily dismantlable adhesive tape which enables interfacial dismantling when the adhesive tape is delaminated from an adherend or a substrate, and an adhesive composition which enables formation of the easily dismantlable adhesive tape.

Means to Solve the Problems

The present invention includes the following aspects.
(1) An easily dismantlable adhesive composition containing: an acrylic polymer; and either an acid catalyst or an acid generator, characterized in that the acrylic polymer is an acrylic polymer containing, as monomer components, a carboxyl-precursor-group-containing-(meth)acrylate monomer, an n-butyl acrylate, and a polar-group-containing monomer, the content of the polar-group-containing monomer being 5 to 30% by mass, relative to the total mass of the monomer components composing the acrylic polymer.

(2) The easily dismantlable adhesive composition according to (1) mentioned above, wherein the carboxyl-precursor-group-containing-(meth)acrylate monomer is at least one selected from the group consisting of tert-butyl (meth)acrylate, 2-methyl-2-adamantyl (meth)acrylate, 2-ethyl-2-adamantyl (meth)acrylate, bornyl (meth)acrylate, isobornyl (meth)acrylate, cyclohexyl (meth)acrylate, and benzyl (meth)acrylate.

(3) The easily dismantlable adhesive composition according to (1) or (2) mentioned above, wherein the polar-group-containing monomer is a hydroxyl-group-containing-vinyl monomer.

(4) The easily dismantlable adhesive composition according to any one of (1) to (3) mentioned above, wherein the content of the carboxyl-precursor-group-containing-(meth)acrylate monomer is 1 to 75% by mass, relative to the total mass of the monomer components composing the acrylic polymer.

(5) The easily dismantlable adhesive composition according to any one of (1) to (4) mentioned above, wherein the acrylic polymer is an acrylic block polymer having: a poly(meth)acrylate chain (A) formed of the carboxyl-precursor-group-containing-(meth)acrylate monomer; and a poly(meth)acrylate chain (B) containing, as monomer components, the n-butyl acrylate and the polar-group-containing monomer.

(6) An easily dismantlable adhesive tape containing an adhesive agent layer formed of the adhesive composition above-mentioned in any one of (1) to (5).

Effects of the Invention

An easily dismantlable adhesive composition according to the present invention enables easy dismantling without any adhesive remaining using a simple method such as heating or light irradiation without deteriorating favorable adhesion properties derived from an acrylic polymer. In addition, when an adhesive tape is delaminated from an adherend or a substrate, an adhesive agent layer is interfacially delaminated with ease, and therefore the adhesive agent layer is hardly present in the adherend or the substrate, and the workability of performing dismantling is favorable. Therefore, the adhesive tape is favorably used to fix members, provisionally fix members, label product information, or the like, in various industrial fields, such as office automation equipment, IT—home electric appliances, automobiles, or the like, to be recycled or reused, without particular limitations, and enables easy dismantling using simple heating equipment, energy-line-irradiation equipment, or the like.

BRIEF DESCRIPTION OF THE DRAWINGS

FIG. 1 shows the 180-degree peel strength (N/20 mm) and the peel distance (mm/20 mm width), measured before and after heating, after UV-irradiation, or after both UV-irradiation and heating in Example 1.

FIG. 2 shows the 180-degree peel strength (N/20 mm) and the peel distance (mm/20 mm width), measured before and after heating, after UV-irradiation, and after both UV-irradiation and heating in Example 2.

FIG. 3 shows the 180-degree peel strength (N/20 mm) and the peel distance (mm/20 mm width), measured before and after heating, after UV-irradiation, and after both UV-irradiation and heating in Example 3.

FIG. 4 shows the 180-degree peel strength (N/20 mm) and the peel distance (mm/20 mm width), measured before and after heating, after UV-irradiation, and after both UV-irradiation and heating in Comparative Example 1.

FIG. 5 shows the 180-degree peel strength (N/20 mm) and the peel distance (mm/20 mm width), measured at an initial stage, and after both UV-irradiation and heating in Example 4.

FIG. 6 shows the 180-degree peel strength (N/20 mm) and the peel distance (mm/20 mm width), measured at an initial stage, and after both UV-irradiation and heating in Comparative Example 2.

EMBODIMENTS OF THE INVENTION

Acrylic Polymer

Figure 1:
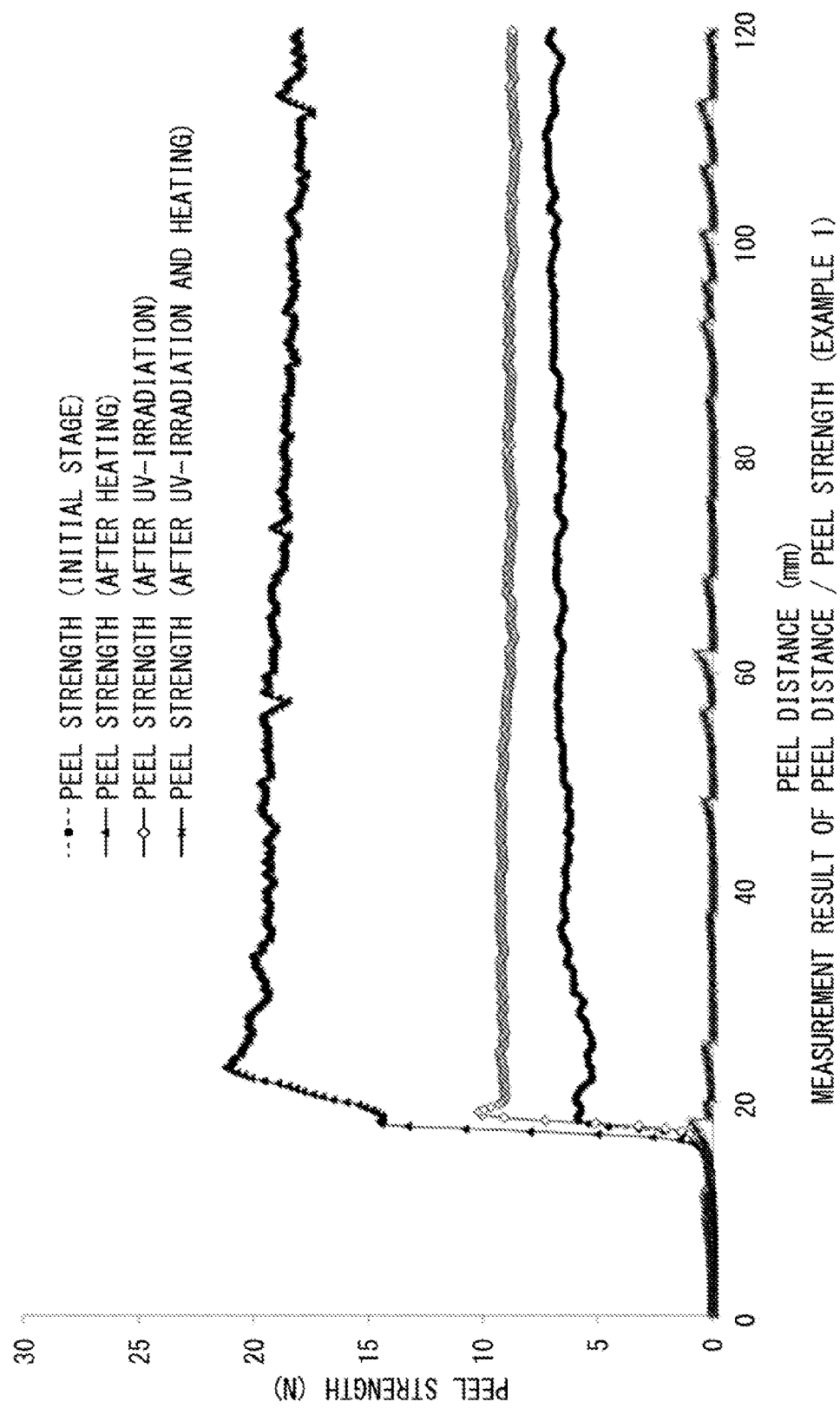
FIG. 1.

An acrylic polymer used in an easily dismantlable adhesive composition according to the present invention is an acrylic polymer containing, as monomer components: a carboxyl-precursor-group-containing-(meth)acrylate monomer, an n-butyl acrylate; and a polar-group-containing monomer, in which the content of the polar-group-containing monomer is 5 to 30% by mass, relative to the total mass of the monomer components composing the acrylic polymer.

The acrylic polymer contains a carboxyl precursor-group derived from the (meth)acrylate monomer at a side chain thereof, and the carboxyl precursor-group is converted into a carboxyl group by an acid component of an acid catalyst or an acid generator which generates an acid influenced by light or heat from outside of an adhesive agent layer, and thereby forming a (meth)acrylic acid. The (meth)acrylic acid increases the cohesive force of the adhesive agent layer and generates foams when the (meth)acrylic acid is formed, as a result of which the adherence property of the adhesive agent layer decreases, and therefore the delaminating properties of the adhesive agent layer are improved to realize favorable dismantling of the adhesive layer when the side chain is decomposed by an acid component generated by external stimuli.

Although there is no particular limitation on the carboxyl precursor-group, provided that conversion into a carboxyl group by an acid is realized, an ester group composed of: an alkyl group having a secondary or tertiary carbon atom which easily causes olefin elimination by an acid; and a carboxyl group is preferably used. In addition, groups other than the alkyl group having a secondary or tertiary carbon atom, such as a benzyl group which is easily eliminated in a moderate condition, may also be preferably used. Among the carboxyl precursor-groups which are eliminated when the side chains are decomposed, those which are eliminated to generate gas of an alkylene, alkane, or the like, are preferable, because they contribute to improvement in the delaminating properties of the adhesive agent layer, and thereby further favorable removability is realized.

A structural unit having the carboxyl precursor-group in the acrylic copolymer, formed from the carboxyl-precursor-group-containing-(meth)acrylate monomer, is preferably a structural unit represented by the following formula (1).

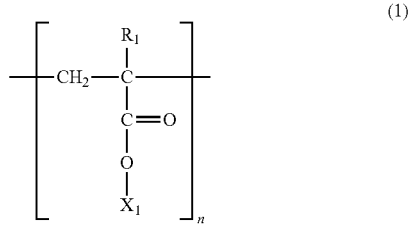
(1)

In the formula (1), $R_1$ represents a hydrogen atom or a methyl group, and preferably represents a hydrogen atom. $X_1$ represents an alkyl group (preferably having 1 to 20 carbon atom(s) and more preferably 1 to 12 carbon atom(s)) which is eliminated to form a carboxyl group in the formula (1) when influenced by an acid. In the case where $X_1$ represents an alkyl group having a secondary or tertiary carbon atom, an oxygen atom of a (meth)acryloyloxy group and the secondary or tertiary carbon atom of the alkyl group are bonded together.

Among the carboxyl-precursor-group-containing-(meth) acrylate monomers, examples of an available (meth)acrylate monomer in which a secondary carbon atom of an alkyl group having a secondary carbon atom and a (meth)acryloyloxy group are bonded together include sec-butyl (meth)acrylate, isopropyl (meth)acrylate, sec-hexyl (meth)acrylate, sec-octyl (meth)acrylate, sec-nonyl (meth)acrylate, sec-decyl (meth) acrylate, bornyl (meth)acrylate, isobornyl (meth)acrylate, and cyclohexyl (meth)acrylate. Among them, cyclohexyl acrylate is preferably used, because favorable dismantling properties are easily exhibited, and a colorless adhesive agent layer having high transparency is easily formed.

Examples of an available (meth)acrylate monomer in which a tertiary carbon atom of an alkyl group having a tertiary carbon atom and a (meth)acryloyloxy group are bonded together include tert-butyl (meth)acrylate, tert-hexyl (meth)acrylate, tert-octyl (meth)acrylate, tert-nonyl (meth) acrylate, tert-decyl (meth)acrylate, and 2-alkyl-2-adamantyl (meth)acrylate such as 2-methyl-2-adamantyl (meth)acrylate.

As other carboxyl-precursor-group-containing-(meth) acrylate monomers, benzyl (meth)acrylate may also be preferably used.

Among the (meth)acrylate monomers, tert-butyl (meth) acrylate, 2-methyl-2-adamantyl (meth)acrylate, 2-ethyl-2-adamantyl (meth)acrylate, bornyl (meth)acrylate, isobornyl (meth)acrylate, cyclohexyl (meth)acrylate, or benzyl (meth) acrylate is arbitrarily preferably selected to be used, because a carboxyl group is favorably formed by an acid in particular, and tert-butyl acrylate is particularly preferably used. In addition, isobornyl acrylate is particularly preferably used, because high thermal stability is realized in addition to favorable producibility of a carboxyl group by an acid, and a colorless adhesive agent layer having high transparency is easily formed.

The content of the carboxyl-precursor-group-containing-(meth)acrylate monomer is preferably 1 to 75% by mass, more preferably 1 to 60% by mass, even more preferably 2 to 50% by mass, and particularly preferably 3 to 40% by mass, relative to the total mass of the monomer components composing the acrylic polymer. In the case where the content thereof is within the above-mentioned range, favorable dismantling properties are easily realized while realizing favorable adhesion properties.

Although an adhesive composition which dismantles when heated or exposed to ultraviolet may be preferably used as the adhesive composition according to the present invention, there is a case where an adhesive composition of which the adhesion force is not significantly decreased when either heating or ultraviolet irradiation is solely conducted but is significantly decreased when both heating and ultraviolet irradiation are conducted is preferable when adhesion stabilities or the like are required. In such a case, the above-exemplified (meth)acrylate monomers in which a significant decrease in the adhesion force is hardly caused by solely conducting either heating or ultraviolet irradiation, while a significant decrease in the adhesion force is easily caused by conducting both heating and ultraviolet irradiation, are preferably used as the carboxyl-precursor-group-containing-(meth)acrylate monomer, and, among them, sec-butyl (meth) acrylate, isopropyl (meth)acrylate, cyclohexyl acrylate, isobornyl acrylate, bornyl acrylate, or tert-butyl acrylate is preferably used in particular.

The acrylic polymer used in the present invention achieves favorable adhesion properties, particularly excellent adhesion properties and dismantling properties under high temperature, by containing, as copolymer monomers, an n-butyl acrylate and a polar-group-containing monomer, in addition to the carboxyl-precursor-group-containing-(meth)acrylate monomer.

Examples of the polar-group-containing monomer include vinyl monomers having a polar group, such as a hydroxyl group, a carboxyl group, an amino group, an imino group, or an amide group, and the monomers are preferable, because the monomers easily contribute to the improvement in the adhesion properties and the cohesive force of the adhesive agent layer when dismantled by intermolecular interaction thereof. Among them, the polar-group-containing vinyl monomer which can form a hydrogen bond is preferably used, and a hydroxyl-group-containing-vinyl monomer is particularly preferable, because the hydroxyl-group-containing-vinyl monomer is excellent in the improvement in the adhesion properties and the temporal stability of the adhesive agent layer after being adhered, and easily ensures the cohesive force in the adhesive agent layer when dismantled, and thereby contributing to the dismantling at the interface between an adherend and the adhesive agent layer or at the interface between the adhesive agent layer and a substrate and easily achieving favorable dismantling properties.

Examples of the hydroxyl-group-containing-vinyl monomer arbitrarily available include 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 2-hydroxyhexyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate. Among them, 2-hydroxyethyl (meth)acrylate or 4-hydroxybutyl (meth)acrylate is preferably used, and 2-hydroxyethyl (meth)acrylate is particularly preferably used.

Examples of the carboxyl-group-containing vinyl monomer available include monomers including a carboxyl group, such as acrylic acid, methacrylic acid, itaconic acid, maleic acid, crotonic acid, acrylic acid dimer, and ethylene oxide-modified succinic acrylate.

Examples of the amide-group-containing vinyl monomer include acrylamide, methacrylamide, diethylacrylamide, N-vinylpyrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetone-acrylamide, and examples of the amino-group-containing vinyl monomer include aminoethyl (meth)acrylate, N, N-dimethylaminoethyl (meth)acrylate, and N, N-dimethylaminopropyl (meth)acrylate.

Examples of the imino group-containing monomer include cyclohexylmaleimide, isopropylmaleimide, N-cyclohexylmaleimide, and itaconic imide.

The content of the n-butyl acrylate is preferably no less than 20% by mass, more preferably 30 to 95% by mass, even more preferably 40 to 90% by mass, and particularly preferably 50 to 80% by mass, relative to the total mass of the monomer components composing the acrylic polymer, because favorable adhesion properties are easily realized when the content thereof is within the above-mentioned range.

The use of the polar-group-containing monomer (preferably a polar-group-containing vinyl monomer) in an amount of 5 to 30% by mass, preferably 8 to 25% by mass, and more preferably 10 to 20% by mass, relative to the total mass of the monomer components composing the acrylic polymer, makes it possible to achieve favorable dismantling, even if the adhesion force is high, and realize favorable dismantling properties at the interface between an adherend and an adhesive agent layer or the interface between an adhesive agent layer and a substrate.

Monomer components other than the above-mentioned monomers may be used as the acrylic polymer used in the present invention, and a (meth)acrylate including an alkyl group having 1 to 14 carbon atom(s), excepting the above-mentioned carboxyl-precursor-group-containing-(meth)acrylate monomer and the n-butyl acrylate, may be used. Examples of the (meth)acrylate including an alkyl group having 1 to 14 carbon atom(s) include methyl (meth)acrylate, ethyl (meth)acrylate, n-butylmethacrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, n-tridecyl (meth)acrylate, n-tetradecyl (meth)acrylate, and the like. In addition, monomers such as styrene or vinyl acetate may be used.

In the case where monomers, excepting the above-mentioned carboxyl-precursor-group-containing-(meth)acrylate monomer, n-butyl acrylate, and polar-group-containing monomer, are used therewith, the content thereof is preferably the same as or less than the content of the n-butyl acrylate used, and preferably 30% by mass or less, more preferably 20% by mass or less, and even more preferably 10% by mass or less, relative to the total content of the monomer components composing the acrylic polymer.

The acrylic polymer used in the present invention may be a random polymer or block polymer composed of the above-mentioned monomer components. It is preferable that the acrylic polymer be a random polymer, because an adhesion force is easily ensured at an initial stage. On the other hand, it is preferable that the acrylic polymer be a block polymer, because stick-slip hardly occurs when delamination is performed at the interface between an adherend and an adhesive agent layer or the interface between an adhesive agent layer and a substrate, and favorable dismantling properties are easily acquired in particular. In the case where the acrylic polymer is a block polymer, it is preferable that the block polymer be composed of: a poly(meth)acrylate chain (A) formed of a carboxyl-precursor-group-containing-(meth)acrylate monomer; and a poly(meth)acrylate chain (B) containing, as monomer components thereof, an n-butyl acrylate and a polar-group-containing monomer, because favorable adhesion and dismantling properties are easily acquired. The block copolymer may be a block copolymer (such as an AB-type block copolymer) composed of a poly(meth)acrylate chain (A) and a poly(meth)acrylate chain (B), or a block copolymer (such as an ABA-type, BAB-type, ABAB-type, or ABABA-type) in which plural poly(meth)acrylate chains (A) and/or plural poly(meth)acrylate chain (B) are randomly block-polymerized. In the case where the poly(meth)acrylate chain (A) is a polymer chain having at least ten repeating units composed of the carboxyl-precursor-group-containing-(meth)acrylate monomer, the side chains thereof are decomposed by an acid component of an acid catalyst or an acid generator which generates an acid influenced by light or heat from outside of an adhesive agent layer, and contributes in delamination of the adhesive agent layer. Although there are no particular limitations on the number of the repeating units, provided that the polymerization thereof is realizable and the adhesion properties are acquired, it is preferable that the number of the repeating units be at least 10, and more preferably at least 20, while the upper limit thereof is preferably 100,000.

In the case where the acrylic polymer is a block copolymer composed of the poly(meth)acrylate chain (A) and the poly(meth)acrylate chain (B), it is preferable that the content ratio of the chain (A) be 75% by mole or less, relative to the total moles of the chains (A) and (B). In addition, it is preferable that the copolymerization rate, indicated as the molar ratio (A)/(B), be 75/25 to 1/99, more preferably 65/35 to 3/97, even more preferably 50/50 to 10/90, and particularly preferably 40/60 to 15/85. In the case where the block-copolymerization rate is between the above-mentioned range, favorable properties such as favorable dismantling properties due to the poly(meth)acrylate chain (A) and adhesion properties due to the poly(meth)acrylate chain (B) are easily achieved.

The mass average molecular weight of the acrylic polymer used in the present invention may be arbitrarily adjusted within the range approximately from 10,000 to 2,000,000 depending on the usage aspect thereof. In the case where the acrylic polymer is prepared by a living radical polymerization technique mentioned below, it is preferable that the mass average molecular weight thereof be 10,000 to 100,000 from the standpoint of maintaining favorable production efficiency, while it is preferable that the mass average molecular weight thereof be at least 150,000, more preferably at least 300,000, and particularly preferably approximately within a range from 450,000 to 1000,000, from the standpoint of maintaining favorable adhesion strength realized prior to dismantling. In the case where the cohesive force in the adhesive agent layer is aimed to be maintained at the time of dismantling in particular, it is preferable that the mass average molecular weight thereof be at least 600,000. It is preferable that the number average molecular weight of the adhesive composition according to the present invention be at least 150,000, because both high adhesion force and favorable dismantling properties are easily achieved.

The mass average molecular weight and the number average molecular weight are determined by gel permeation chromatography (GPC) against polystyrene standards. Examples of the measurement conditions include: using HLC-8220GPC (manufactured by TOSHO CORPORATION) with a column under the name of TSKgel GMHXL (manufactured by TOSHO CORPORATION); setting the column temperature at 40° C.; using tetrahydrofuran as an eluent; setting the flow rate at 1.0 mL/minute; and using TSK standard polystyrene as the standard polystyrene.

A chain transfer agent may be used when polymerization is conducted, in order to adjust the molecular weight of the resultants. Examples of the chain transfer agent include well-known chain transfer agents, such as, laurylmercaptan, glycidylmercaptan, mercaptoacetic acid, 2-mercaptoethanol, thioglycolic acid, 2-ethylhexyl thioglycolate, 2,3-dimethylcapto-1-propanol, and the like.

The acrylic polymer may be prepared, for example, by subjecting a mixture of the above-mentioned acrylic monomers to radical polymerization reaction. Specific examples of the production process of the acrylic polymer include: a living radical polymerization technique; and well-known radical polymerization techniques conducted using an azo-based initiator or a peroxide. Among them, the radical polymerization techniques are preferably adopted, because occurrence of side reactions, such as chain transfer reaction or termination reaction, during a radical polymerization process, is prevented, and generation of low-molecular components is suppressed, and an acrylic polymer having a narrow molecular-weight-distribution is obtainable.

Examples of the living radical polymerization technique include: an atom transfer radical polymerization technique (ATRP method); a living radical polymerization technique conducted using an organic heterocompound containing an atom of group 15 or group 16 in the high periodic system as a catalyst (radical polymerization technique mediated by an organic heterocompound) (TERP method or the like); reversible addition-fragmentation chain-transfer polymerization (RAFT method), and the like.

The atom transfer radical polymerization technique (ATRP method) is a method, for example, in which the acrylic monomers are polymerized in the presence of both a transition metal complex and an organohalide.

Examples of an available transition metal composing the transition metal complex include: Cu, Ru, Fe, Rh, V, Ni, and halides thereof. Examples of a ligand to be coordinated with the transition metal include bipyridyl derivatives, mercaptan derivatives, trifluorate derivatives, tertiary alkylamine derivatives, and the like.

The organohalide is a polymerization initiator, and examples thereof include methyl 2-bromo (or chloro) propionate, ethyl 2-bromo (or chloro) propionate, methyl 2-bromo (or chloro)-2-methyl propionate, ethyl 2-bromo (or chloro)-2-methyl propionate, chloro (or bromo) 1-phenylethyl, 2-hydroxyethyl 2-bromo (or chloro) propionate, 4-hydroxybutyl 2-bromo (or chloro) propionate, 2-hydroxyethyl 2-bromo (or chloro)-2-methyl propionate, 4-hydroxybutyl 2-bromo (or chloro)-2-methyl propionate, and the like.

The radical polymerization technique mediated by an organic heterocompound is a method in which the acrylic monomers are polymerized in the presence of both an organic heterocompound and a radical initiator. The radical polymerization technique mediated by an organic heterocompound is preferably adopted, because the molecular weight of the acrylic copolymer is easily increased, and the adhesion force is easily improved.

Examples of an organic heterocompound preferably used in the radical polymerization technique mediated by the organic heterocompound include organic tellurium compounds, organic ditelluride compounds, organic bismuth compounds, and organic antimony compounds. Specific examples of the organic heterocompound arbitrarily used include well-known compounds, such as, organic tellurium compounds and organic ditelluride compounds, disclosed in Japanese Patent Application Laid-Open No. 2004-323693, WO 2004/14818, Japanese Patent Application Laid-Open No. 2006-225524, Japanese Patent Application Laid-Open No. 2006-299278, Japanese Patent Application Laid-Open No. 2008-291216, Japanese Patent Application Laid-Open No. 2009-149877, or the like; organic bismuth compounds disclosed in Japanese Patent Application Laid-Open No. 2009-149877, WO 2006/62255, or the like; and organic antimony compounds disclosed in Japanese Patent Application Laid-Open No. 2009-149877, WO 2006/1496, or the like. More specific examples thereof include: methyl 2-methyltellanyl-2-methyl propionate, ethyl 2-methyltellanyl-2-methyl propionate, ethyl 2-n-butyl-2-phenyltellanyl propionate, ethyl 2-methyl-2-phenyltellanyl propionate, 2-methyltellanyl propionitrile, 2-methyl-2-methyltellanyl propionitrile, (methyltellanyl methyl)benzene, (1-methyltellanyl-ethyl) benzene, (2-methyltellanyl-propyl)benzene, (1-phenyltellanyl-ethyl)benzene, ethyl 2-methyl-2-n-butyltellanyl-propionate, 2-methyl-2-dimethylbismuthanyl propionic acid methyl ester, 2-methyl-2-diphenylbismuthanyl propionitrile, 2-methyl-2-dimethylphenylbismuthanyl propionitrile, methyl 2-methyl-2-dimethylstibanyl propionate, 2-methyl-2-dimethylstibanyl propionitrile, 1-dimethylstibanyl-1-phenylethane, dimethylditelluride, diethylditelluride, di-n-propylditelluride, diisopropylditelluride, dicyclopropylditelluride, di-n-butylditelluride, di-sec-butylditelluride, di-tert-butylditelluride, dicyclobutylditelluride, diphenylditelluride, bis-(p-methoxyphenyl)ditelluride, bis-(p-aminophenyl)ditelluride, bis-(p-nitrophenyl)ditelluride, bis-(p-cyanophenyl)ditelluride, bis-(p-sulfonylphenyl)ditelluride, dinaphthylditelluride, dipyridylditelluride, and the like. Compounds such as dimethylditelluride, diethylditelluride, di-n-propylditelluride, di-n-butylditelluride, diphenylditelluride, and the like, may be preferably exemplified.

The acrylic polymer may be prepared, for example, by polymerizing the carboxyl-precursor-group-containing-(meth)acrylate monomers using the above-mentioned radical polymerization technique to form a poly(meth)acrylate chain (A) that is a homopolymer composed of the carboxyl-precursor-group-containing-(meth)acrylate monomer, followed by forming a poly(meth)acrylate chain (B) in the same manner as mentioned above, and then forming the bond between an acetylenic group and an azido group using a click reaction such as cycloaddition reaction, the acetylenic group and the azido group being introduced into the poly(meth)acrylate chains (A) and (B), respectively.

Acid Catalyst and Acid Generator

Examples of an acid catalyst arbitrarily selectable to be used in the present invention include: aromatic sulfonic acids, such as p-toluenesulfonic acid and benzenesulfonic acid; organic acids such as aliphatic sulfonic acids; inorganic acids such as hydrochloric acid and sulfuric acid; and hydrates thereof.

Examples of an acid generator used in the present invention include: photoacid generators, which generate acids upon exposure to photoradiation with an energy line such as ultraviolet, the acids having an ability to initiate cation polymerization; and thermal acid generators, which generate acids when heating is conducted. Among them, the photoacid generators are particularly preferably used, because the photoacid generators make it possible for an adhesive agent layer to be favorably dismantled when exposed to two kinds of external stimuli, that is heat and light, while the photoacid generators, when used in an adhesive composition to be stored or in an adhesive tape to be used to fix members, make it possible to suppress easy disintegrating or dismantling thereof and maintain stable preservative qualities and adhesive properties thereof.

Examples of the photoacid generator arbitrarily available include n-hydroxy naphthalimide trifluoromethane sulfonic acid ester, n-hydroxy naphthalimide methane sulfonic acid ester, n-hydroxy naphthalimide benzene sulfonic acid ester, n-hydroxy naphthalimide triflate, bis(cyclohexylsulfonyl) diazo methane, bis(tert-butylsulfonyl) diazo methane, bis(p- toluenesulfonyl)diazo methane, triphenyl sulfonium trifluoromethane sulfonate, diphenyl-4-methylphenyl sulfonium trifluoromethane-2,4,6-trimethyl phenyl sulfonium-p-toluene sulfonate, bis(dodecylphenyl) iodonium hexafluoroantimonate, bis(tert-butylphenyl) iodonium hexafluorophosphate, bis(tert-butylphenyl) iodonium trifluoromethane sulfonate, triphenylsulfonium trifluoromethane sulfonate, biphenyl iodonium trifluoromethane sulfonate, phenyl(3-hydroxypentadecylphenyl) iodonium hexafluoroantimonate, and phenyl(3-hydroxypentadecylphenyl) iodonium hexafluoroantimonat.

The photoacid generators may be arbitrarily selected depending on the intended use. For example, there is a case where the decomposition temperatures of the acid generators decrease when mixed with an adhesive agent, and therefore those having an inherent decomposition temperature of approximately at least 150° C., such as n-hydroxy naphthalimide trifluoromethane sulfonic acid ester or bis(cyclohexylsulfonyl) diazomethane, are preferably used, from the standpoint of preventability of: acid-generation influenced by heat when stored or the like; and progress of dismantling of an adhesive composition.

Among the photoacid generators, photoacid generators which generate gas when heating is conducted, such as bis(cyclohexylsulfonyl) diazomethane, are preferable, because particularly high dismantling properties are easily achieved, by generating: acid due to photoradiation; and gas due to heating. The photoacid generators which hardly generate gas even when heated at approximately 100° C., such as N-hydroxy naphthalimide trifluoromethane sulfonic acid ester, are preferable, because an adhesive agent layer having a high thermal stability can be formed.

Among the photoacid generators, the photoacid generators having a photoabsorbent structure in the skeleton thereof, such as a benzene ring or a naphthalene ring, are preferable, because favorable dismantling properties can be achieved even when the photoradiation time is brief or the content thereof is small, and thereby easily decreasing the production cost or dismantling cost. On the other hand, photoacid generators free from the photoabsorbent structure are preferably used when the stability against the photoradiation is required.

Examples of the thermal acid generator arbitrarily available include sulfonium salts, benzothiazonium salts, ammonium salts, and phosphonium salts, and specific examples thereof include 4-acetoxy phenyldimethylsulfonium hexafluoroarsenate, benzyl-4-hydroxyphenylmethylsulfonium hexafluoroantimonate, 4-acetoxy phenylbenzylmethylsulfonium hexafluoroantimonate, dibenzyl-4-hydroxyphenyl sulfonium hexafluoroantimonate, 4-acetoxy phenylbenzylsulfonium hexafluoroantimonate, and 3-benzylbenzothiazolium hexafluoroantimonate.

Adhesive Composition

An adhesive composition according to the present invention contains: the acrylic polymer; and either the acid catalyst or the acid generator. An adhesive agent layer composed of the adhesive composition realizes sufficient adhesive properties derived from the acrylic polymer when affixed, and realizes significant decreasing of the adhesive force when dismantled by conducting heating or photoradiation in the presence of the acid catalyst or the acid generator which generates acids influenced by external stimuli such as heat or light, to decompose a carboxyl precursor-group (preferably a secondary or tertiary carbon atom, to which a (meth)acryloyloxy group is bonded) in the side chain of the acrylic polymer. In addition, favorable dismantling properties make it possible to easily cause dismantling at the interface between an adherend and the adhesive agent layer or the interface between the adhesive agent layer and a substrate.

Although the content of the acid catalyst or the acid generator in the adhesive composition may be arbitrarily determined depending on the kind of the acid catalyst or acid generator used, or intended dismantling properties, it is preferable that the content be 10% by mole or less, and particularly preferably within the range from 1 to 10% by mole, relative to 1 mole of the carboxyl precursor-group in the carboxyl-precursor-group-containing-(meth)acrylate.

Among them, in the case where the photoacid generator having a photoabsorbent structure is used, the content thereof is preferably approximately 0.1 to 5% by mole, and particularly preferably 0.1 to 3% by mole. On the other hand, in the case where the photoacid generator free from the photoabsorbent strucuture is used, the content thereof is preferably approximately 3 to 10% by mole, and particularly preferably 4 to 8% by mole.

It is preferable that the content of the acid catalyst or the acid generator be 15 parts by mass or less, relative to 100 parts by mass of the acrylic polymer. Among them, in the case where the photoacid generator having a photoabsorbent structure is used, the content thereof is preferably approximately 0.1 to 5 parts by mass, and particularly preferably 0.2 to 3 parts by mass, relative to 100 parts by mass of the acrylic polymer. On the other hand, in the case where the photoacid generator free from the photoabsorbent structure is used, the content thereof is preferably approximately 5 to 15 parts by mass, and particularly preferably 7 to 12 parts by mass, relative to 100 parts by mass of the acrylic polymer.

The adhesive composition according to the present invention is an acrylic adhesive composition containing an acrylic polymer as the main component thereof, and the adhesive composition may solely contain the above-mentioned acrylic polymer as the acrylic polymer, or further contain another acrylic polymer together therewith as the acrylic polymer. In addition, the adhesive composition may contain a tackifier resin, a cross-linker, another additive agent, or the like, as needed.

(Tackifier Resin)

The adhesive composition according to the present invention may contain a tackifier resin in order to adjust the high adhesion properties of the obtained adhesive agent layer. Examples of the tackifier resin available in the present invention include rosins, polymerized rosins, polymerized rosin esters, rosin phenols, stabilized rosin esters, dismutated rosin esters, terpenes, terpene phenols, and petroleum resins.

(Solvent)

The adhesive composition according to the present invention may contain a solvent conventionally used in an adhesive composition, and examples thereof include toluene, xylene, ethyl acetate, butyl acetate, acetone, methyl ethyl ketone, hexane, and the like. In the case of a water-based adhesive composition, water or an aqueous solvent containing water as the main component thereof may be used.

(Cross-linker)

The adhesive composition according to the present invention preferably contains a cross-linker in order to improve a cohesive force of the obtained adhesive agent layer. Examples of the cross-linker include conventionally known isocyanate-based cross-linkers, epoxy-based cross-linkers, aziridine-based cross-linkers, multivalent metal salt-based cross-linkers, metallic chelate-based cross-linkers, keto-hydrazide-based cross-linkers, oxazoline-based cross-linkers, carbodiimide-based cross-linkers, silane-based cross-linkers, and glycidyl (alkoxy) epoxy silane-based cross-linkers.

(Additive Agent)

The adhesive composition according to the present invention may optionally contain known additive agents, such as, a base (such as ammonia water) or an acid to adjust the pH thereof, a foaming agent, a plasticizer, a softener, an antioxidant, a filler, such as a glass- or plastic-fiber, balloon, bead, or metallic powder, a colorant such as a pigment or dye, a pH adjuster, a film-forming aid, a leveling agent, a thickener, a water repellent agent, or an antifoamer, as needed, provided that intended effects of the present invention are achieved without being disturbed.

The foaming agent may be used to progress dismantling of the adhesive agent, and examples thereof include an inorganic foaming agent, an organic foaming agent, and thermally expandable hollow sphere, the volume of which being expanded when heating is conducted.

Easily Dismantlable Adhesive Tape

An easily dismantlable adhesive tape according to the present invention is an adhesive tape containing an adhesive agent layer composed of the adhesive composition. The adhesive agent layer may be composed of a single adhesive agent layer or plural adhesive agent layers laminated. In addition, the adhesive tape may have a substrate or may be composed of only the adhesive agent layer(s) free from any substrates. In addition, the adhesive tape may be an adhesive tape having the adhesive agent layer(s) on one surface of a substrate or a double-faced adhesive tape having the adhesive agent layers on both surfaces of a substrate. In the case where the adhesive tape is used to fix at least two members, the adhesive tape composed of only the adhesive agent layer(s) or the double-faced adhesive tape is preferably used.

Examples of the substrate include: plastic film, formed of polyolefins (such as polypropylene or polyethylene), polyesters (such as polyethylene terephthalate or polyethylene naphthalate), polystyrenes, ABS, polycarbonate, polyimide film, polyvinyl chloride, nylon, polyvinyl alcohol, or the like; non-woven cloth, formed of pulp, rayon, Manila fiber, acrylonitrile, nylon, polyester, or the like; paper, cloth, metallic foil, and the like, and polyester-based film or non-woven cloth is preferably used, because such a use makes it easy to realize both removability and adhesion properties.

In addition, one surface or both surfaces of the substrate may be subjected to corona treatment, plasma treatment, anchorcoat treatment, or the like, for the purpose of improving the adhesiveness between the substrate and the adhesive agent layer.

In the case where the easily dismantlable adhesive tape according to the present invention includes a substrate, the adhesive tape may be prepared by a direct coating method in which the adhesive composition is directly coated on the substrate using a roll coater, a die coater, or the like, and then dried, and a separator is fixed thereon, or a transfer method in which the adhesive composition is coated on a separator, dried, and then transferred to the substrate. In the case where the adhesive tape is free from any substrates, the adhesive tape may be prepared by coating the adhesive composition on a separator, and then fixing another separator thereon.

The easily dismantlable adhesive tape according to the present invention preferably has an adhesion force of at least 1 N/20 mm, more preferably 2 to 30 N/20 mm, and particularly preferably 3 to 20 N/20 mm, when the adhesive tape is prepared by coating and drying the easily dismantlable adhesive composition on a PET film having a thickness of 50 μm using an applicator having a gap of 8 milli-inch, and the adhesion force is determined by pressure-bonding the adhesive tape on a SUS board by rolling a hand roller having a weight of 2 kg thereon back and forth under an environment with a temperature of 23° C. and a humidity of 50%, and then leaving the adhesive tape still for 1 hour, followed by peeling off the adhesive tape in a 180° direction at a rate of 30 mm/minute using a peeling tester. The easily dismantlable adhesive tape according to the present invention exhibits favorable dismantling properties, even if the adhesive tape exhibits a high adhesion force when used to fix members.

(Dismantling Method)

The easily dismantlable adhesive tape according to the present invention favorably bonds with an adherend or fixes members therebetween when bonded, whereas the adhesive tape can be favorably delaminated by external stimuli such as heat or light when dismantled and delaminated. Although the external stimuli such as heat or light may be arbitrarily adjusted depending on the acid catalyst or acid generator used, it is preferable that the adhesive tape be delaminable under temperature, heat intensity, and light conditions, the conditions being not usually generated in bonding aspects.

In the case where the easily dismantlable adhesive tape according to the present invention contains the acid catalyst, heating of the adhesive tape makes it possible to promote the elimination reaction of the carboxyl precursor-group and increase the fluidity in the adhesive agent layer, which allows the acid to favorably diffuse in the adhesive agent layer, and thereby realizing favorable dismantling of the adhesive tape. In the case where the adhesive tape contains the acid generator which generates an acid by heat or light, although the adhesive tape is favorably dismantled by conducting photo-radiation or heating to generate an acid, further heating in the presence of the acid, as needed, realizes more favorable dismantling of the adhesive tape due to the acid diffusion caused by further promotion of the elimination reaction of the carboxyl precursor-group and an increase in the fluidity of the adhesive agent layer. In particular, it is preferable in the present invention that the photoacid generator be used to generate an acid having an ability to dismantle the adhesive agent by being exposed to light such as ultraviolet and heating be conducted to efficiently progress dismantling of the adhesive agent due to the generated acid.

The photointensity of ultraviolet or the like may be at least an energy which allows the photoacid generator used to favorably generate an acid, and the heating temperature may be at least a temperature which allows the thermal acid generator to favorably generate an acid. The heating temperature in the presence of an acid may be adjusted to a temperature at which the fluidity in the adhesive agent layer is increased, depending on the glass transition temperature of the adhesive composition, to efficiently diffuse the acid, or a temperature at which the elimination reaction of carboxyl precursor-groups is promoted to efficiently decompose side chains thereof.

The easily dismantlable adhesive tape according to the present invention has adhesion properties favorable to fix members, and particularly exhibits excellent adhesion properties under high temperature. In addition, the adhesive tape has removability which enables an easy dismantling thereof when exposed to external stimuli, such as heat or light, to remove defects in adhesion at a working process or separate members at a recycling process. Accordingly, the adhesive tape is preferably used to fix members of various products in industrial applications, such as automobiles, building-products, office automation equipment, home electronics, or the like.

EXAMPLES

Preparation Example 1

A mixed solution composed of 0.96 mg of 2, 2'-azobis (4-methoxy-2,4-dimethyl valeronitrile) (AMVN), 1.89 g of t-butyl acrylate, 3.11 g of n-butyl acrylate, 0.65 g of 2-hydroxyethyl acrylate, and 5.65 g of ethyl acetate was put in a test tube, and any gas existing therein was expelled by conducting argon gas bubbling for 30 minutes. 3.56 µL of an organic tellurium compound was added to the test tube using a microsyringe, and the reaction was performed for 4 hours in an oil bath at 50° C. As a result of $^1$H-NMR (300 MHz) analysis thereof, the polymerization rate of t-butyl acrylate was 77%, the polymerization rate of n-butyl acrylate was 76%, and the polymerization rate of 2-hydroxyethyl acrylate was 79%. After the completion of the reaction, the polymer solution was poured into a mixture composed of methanol and water (having a volume fraction ratio of 80:20) to precipitate polymers, and then a supernatant solution was removed therefrom by conducting decantation. The obtained precipitate was dissolved in 50 mL of chloroform, and the solution was poured into a mixture composed of methanol and water (having a volume fraction ratio of 80:20) to reprecipitate polymers. After a supernatant solution was removed therefrom by conducting decantation, vacuum drying was conducted for 10 hours at 40° C. under reduced pressure to obtain an acrylic random copolymer (1). As a result of GPC analysis thereof, Mn was 253,400, Mw was 475,000, and PD was 1.88. The mass ratio of components in the copolymer was tBA/nBA/HEA=33.5/53.7/12.8.

Preparation Example 2

Synthesis of poly(t-butylacrylate) (1): A mixed solution composed of 1.21 mg of 2, 2'-azobis(4-methoxy-2,4-dimethylvaleronitrile) (AMVN), 1.33 g of t-butyl acrylate, and 2.66 g of ethyl acetate was put in a test tube, and any gas existing therein was expelled by conducting argon gas bubbling for 30 minutes. 4.49 µL of an organic tellurium compound was added to the test tube using a microsyringe, and the reaction was performed for 2 hours in an oil bath at 50° C. to obtain a reactant solution of poly(t-butylacrylate) (1). As a result of $^1$H-NMR (300 MHz) analysis thereof, the polymerization rate was 79%. As a result of GPC analysis thereof, Mn was 73,800, and PD was 1.26.

Synthesis of Acrylic Block Copolymer (1): A mixed solution composed of 5.90 g of n-butyl acrylate and 1.16 g of 2-hydroxyethyl acrylate, the mixed solution being previously subjected to argon-gas-bubbling for 30 minutes, was added to the reactant solution of poly(t-butylacrylate) (1) obtained above, and then the reaction was performed at 50° C. for 3 hours. As a result of $^1$H-NMR (300 MHz) analysis thereof, the polymerization rate of t-butyl acrylate was 90%, the polymerization rate of 2-ethylhexyl acrylate was 42%, and the polymerization rate of n-butyl acrylate was 49%.

After the completion of the reaction, the polymer solution was poured into a mixture composed of methanol and water (having a volume fraction ratio of 80:20) to precipitate polymers, and then a supernatant solution was removed therefrom by conducting decantation. The obtained precipitate was dissolved in 50 mL of chloroform, and the solution was then poured into a mixture composed of methanol and water (having a volume fraction ratio of 80:20) to reprecipitate polymers. After a supernatant solution was removed therefrom by conducting decantation, vacuum drying was conducted for 10 hours at 40° C. under reduced pressure to obtain an acrylic block copolymer (1). As a result of GPC analysis thereof, Mn was 266,300, Mw was 570,000, and PD was 2.14. The mass ratio of components in the copolymer was tBA/nBA/HEA=33.2/53.1/13.7.

Preparation Example 3

A mixed solution composed of 1.23 mg of 2, 2'-azobis(4-methoxy-2,4-dimethyl valeronitrile) (AMVN), 1.89 g of t-butyl acrylate, 3.29 g of n-butyl acrylate, 0.16 g of 2-hydroxyethyl acrylate, and 2.05 g of ethyl acetate was put into a test tube, and then any gas existing therein was expelled by conducting argon gas bubbling for 30 minutes. 4.55 µL of an organic tellurium compound was added to the test tube using a microsyringe, and the reaction was performed for 5 hours in an oil bath at 50° C. As a result of $^1$H-NMR (300 MHz) analysis thereof, the polymerization rate of t-butyl acrylate was 91%, the polymerization rate of n-butyl acrylate was 90%, and the polymerization rate of 2-hydroxyethyl acrylate was 90%. After the completion of the reaction, the polymer solution was poured into a mixture composed of methanol and water (having a volume fraction ratio of 80:20) to precipitate polymers, and then a supernatant solution was removed therefrom by conducting decantation. The obtained precipitate was dissolved in 50 mL of chloroform, and then the solution was poured into a mixture composed of methanol and water (having a volume fraction ratio of 80:20) to reprecipitate polymers. After a supernatant solution was removed therefrom by conducting decantation, vacuum drying was conducted for 10 hours at 40° C. under reduced pressure to obtain an acrylic random copolymer (2). As a result of GPC analysis thereof, Mn was 277,100, Mw was 463,000, and PD was 1.67. The mass ratio of components in the copolymer was tBA/nBA/HEA=33.6/61.1/3.4.

Preparation Example 4

A mixed solution composed of 4.47 mg of 2, 2'-azobis (isobutyronitrile) (AIBN), 1.15 g of t-butyl acrylate (tBA), 1.92 g of n-butyl acrylate (nBA), 0.38 g of 2-hydroxyethyl acrylate (HEA), and 6.90 g of toluene was put into a test tube, any gas existing therein was expelled by conducting argon gas bubbling for 30 minutes, and then the reaction was performed for 3 hours in an oil bath at 60° C. As a result of $^1$H-NMR (300 MHz) analysis thereof, the polymerization rate of t-butyl acrylate was 49%, the polymerization rate of n-butyl acrylate was 45%, and the polymerization rate of 2-hydroxyethyl acrylate was 62%.

After the completion of the reaction, the polymer solution was diluted with 20 mL of chloroform, and then was poured into a mixture composed of methanol and water (having a volume fraction ratio of 80:20) to precipitate polymers, and a supernatant solution was removed therefrom by conducting decantation. The obtained precipitate was dissolved in 50 mL of chloroform, and then the solution was poured into a mixture composed of methanol and water (having a volume fraction ratio of 80:20) to reprecipitate polymers. After a supernatant solution was removed therefrom by conducting decantation, vacuum drying was conducted for 10 hours at 40° C. under reduced pressure to obtain an acrylic random copolymer (3). As a result of GPC analysis thereof, Mn was 209,400, and PD was 2.10. The mass ratio of components in the copolymer was tBA/2nBA/HEA=33.1/51.6/15.3.

Preparation Example 5

Synthesis of poly(t-butylacrylate) (2): A mixed solution composed of 0.76 mg of 2, 2'-azobis (4-methoxy-2,4-dimethyl valeronitrile) (AMVN), 1.32 g of t-butyl acrylate (tBA), and 2.63 g of ethyl acetate was put into a test tube, and then any gas existing therein was expelled by conducting argon gas bubbling for 30 minutes. 2.80 µL of an organic tellurium compound was added to the test tube using a microsyringe, and the reaction was performed for 2 hours in an oil bath at 50° C. to obtain a reactant solution of a poly(t-butylacrylate) (2). As a result of $^1$H-NMR (300 MHz) analysis thereof, the polymerization rate thereof was 63%. As a result of GPC analysis thereof, Mn was 55,700 and PD was 1.31.

Synthesis of an Acrylic Block Copolymer (2): A mixed solution composed of 4.86 g of n-butyl acrylate (nBA) and 0.61 g of 2-hydroxyethyl acrylate (HEA), the mixed solution being previously treated by conducting argon gas bubbling for 30 minutes, was added to the reactant solution of the poly(t-butylacrylate) (2) obtained above, and then the reaction was performed at 50° C. for 5 hours. As a result of $^1$H-NMR (300 MHz) analysis thereof, the polymerization rate of t-butyl acrylate was 75%, the polymerization rate of n-butyl acrylate was 41%, and the polymerization rate of 2-hydroxyethyl acrylate was 48%.

After the completion of the reaction, the polymer solution was poured into a mixture composed of methanol and water (having a volume fraction ratio of 80:20) to precipitate polymers, and then a supernatant solution was removed therefrom by conducting decantation. The obtained precipitate was dissolved in 50 mL of chloroform, and then the solution was poured into a mixture composed of methanol and water (having a volume fraction ratio of 80:20) to reprecipitate polymers. After a supernatant solution was removed therefrom by conducting decantation, vacuum drying was conducted for 10 hours at 40° C. under reduced pressure to obtain an acrylic block copolymer (2) composed of a poly(t-butylacrylate) chain and a polyacrylate chain formed of other copolymer components. As a result of GPC analysis thereof, Mn was 190,000, Mw was 304,000, and PD was 1.60. The mass ratio of components in the copolymer was tBA/nBA/HEA=28.2/61.4/10.4.

Preparation Example 6

Synthesis of poly(t-butylacrylate) (3): A mixed solution composed of 0.93 mg of 2, 2'-azobis (4-methoxy-2,4-dimethyl valeronitrile) (AMVN), 1.71 g of t-butyl acrylate, and 3.42 g of ethyl acetate was put into a test tube, and then any gas existing therein was expelled by conducting argon gas bubbling for 30 minutes. 3.43 μL of an organic tellurium compound was added to the test tube using a microsyringe, and then the reaction was performed for 2 hours in an oil bath at 50° C. to obtain a reactant solution of a poly(t-butylacrylate) (3). As a result of $^1$H-NMR (300 MHz) analysis thereof, the polymerization rate thereof was 76%. As a result of GPC analysis thereof, Mn was 93,200, and PD was 1.30.

Synthesis of an Acrylic Block Copolymer (3): 5.66 g of 2-ethylhexyl acrylate (2EHA) and 0.23 g of 2-hydroxyethyl acrylate, which were previously treated by conducting argon gas bubbling for 30 minutes, were added to the reactant solution of the poly(t-butylacrylate) (3) obtained above, and then the reaction was performed at 50° C. for 4 hours. As a result of $^1$H-NMR (300 MHz) analysis thereof, the polymerization rate of t-butyl acrylate was 87%, the polymerization rate of 2-ethylhexyl acrylate was 46%, and the polymerization rate of 2-hydroxyethyl acrylate was 52%.

After the completion of the reaction, the polymer solution was poured into a mixture composed of methanol and water (having a volume fraction ratio of 80:20) to precipitate polymers, and then a supernatant solution was removed therefrom by conducting decantation. The obtained precipitate was dissolved in 50 mL of chloroform, and then the solution was poured into a mixture composed of methanol and water (having a volume fraction ratio of 80:20) to reprecipitate polymers. After a supernatant solution was removed therefrom by conducting decantation, vacuum drying was conducted for 10 hours at 40° C. under reduced pressure to obtain an acrylic block copolymer (3). As a result of GPC analysis thereof, Mn was 257,800, Mw was 383,000, and PD was 1.49. The mass ratio of components in the copolymer was tBA/2EHA/HEA=35.3/61.5/3.2.

Example 1

To the acrylic random copolymer (1) obtained in the Preparation Example 1, 0.4% by mole of n-hydroxynaphthalimide-triflate (NIT), relative to a t-butyl group in the acrylic random copolymer (1), was added as a photoacid generator, and then the mixture was diluted with acetone to obtain a 15% by weight acetone solution as an adhesive composition. The obtained adhesive composition was applied on a PET film having a thickness of 50 μm using an applicator having a gap of 8 milli-inch, and then dried under reduced pressure for 12 hours to obtain an adhesive sheet. The obtained adhesive sheet was evaluated in terms of dismantling properties by conducting the below-mentioned dismantling property test. The obtained results are shown in Table 1 and FIG. 1.

Example 2

Figure 2:
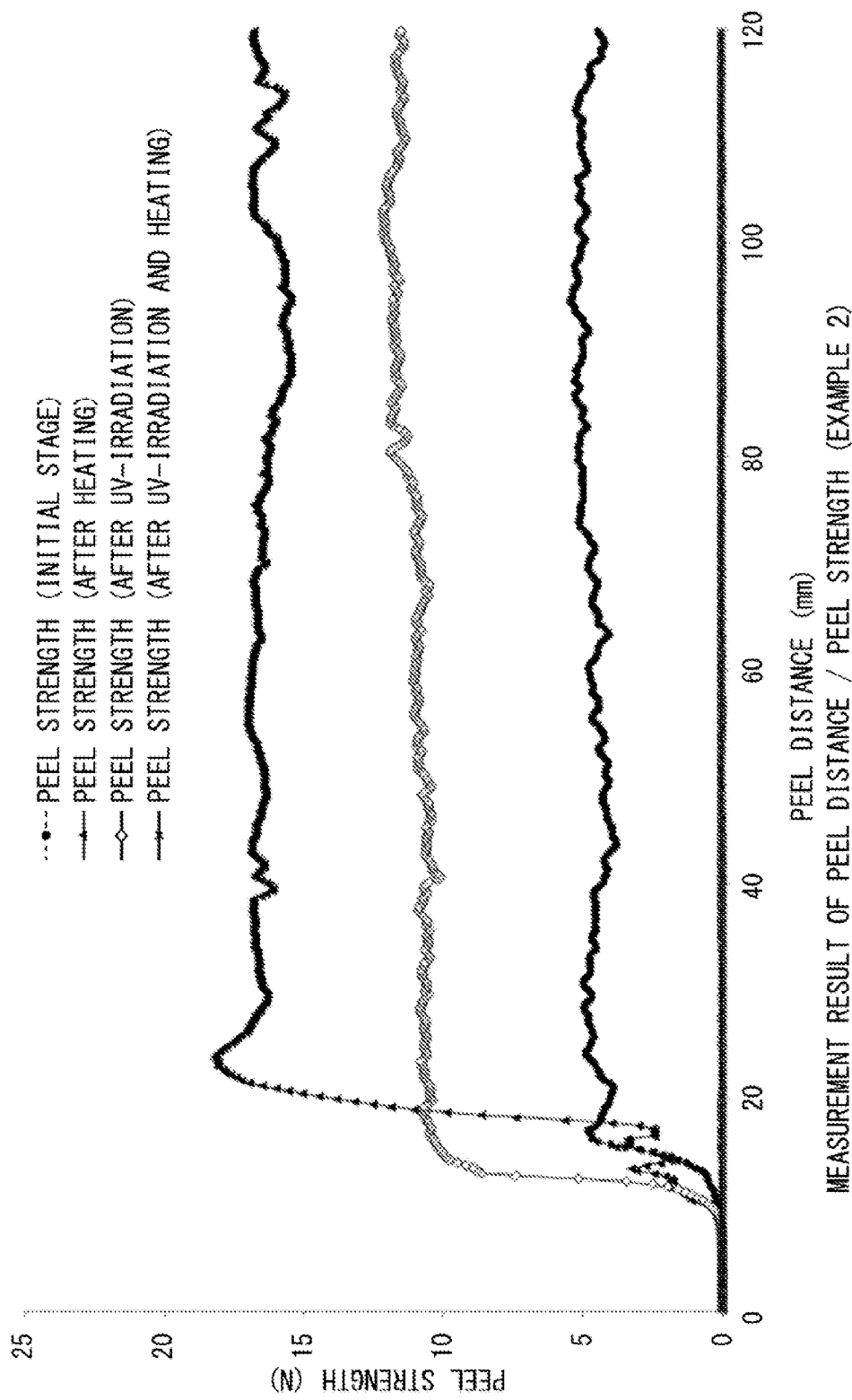
FIG. 2.

An adhesive composition was prepared in a similar manner to that of Example 1, except that the acrylic block copolymer (1) obtained in the Preparation Example 2 was used instead of the acrylic random copolymer (1). The obtained adhesive composition was used to prepare an adhesive sheet in a similar manner to that of Example 1, and the dismantling properties thereof were evaluated. The obtained results are shown in Table 1 and FIG. 2.

Example 3

Figure 3:
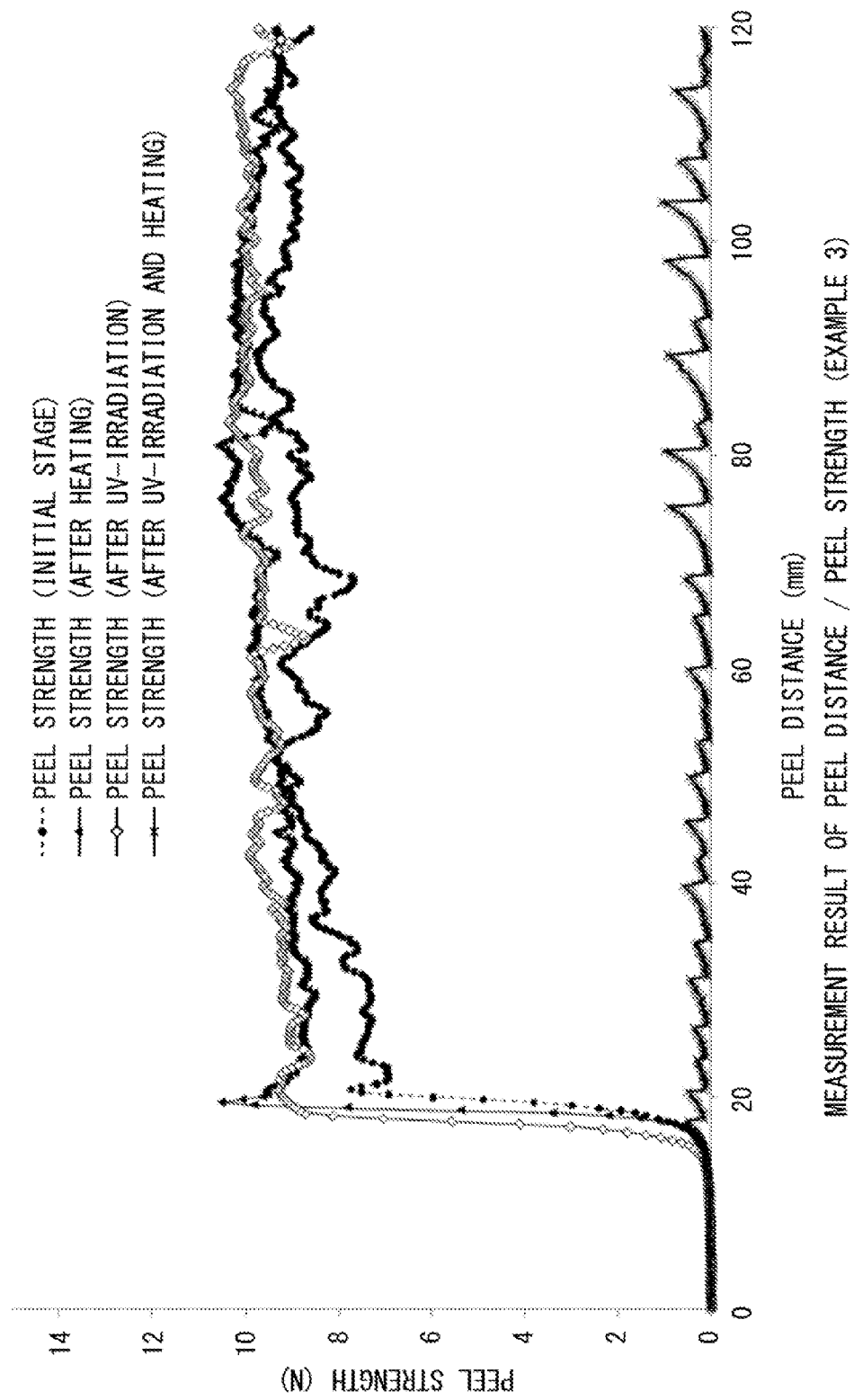
FIG. 3.

An adhesive composition was prepared in a similar manner to that of Example 1, except that the acrylic random copolymer (3) obtained in the Preparation Example 4 was used instead of the acrylic random copolymer (1). The obtained adhesive composition was used to prepare an adhesive sheet in a similar manner to that of Example 1, and the dismantling properties and adhesion properties thereof were evaluated. The obtained results are shown in Table 1 and FIG. 3.

Comparative Example 1

Figure 4:
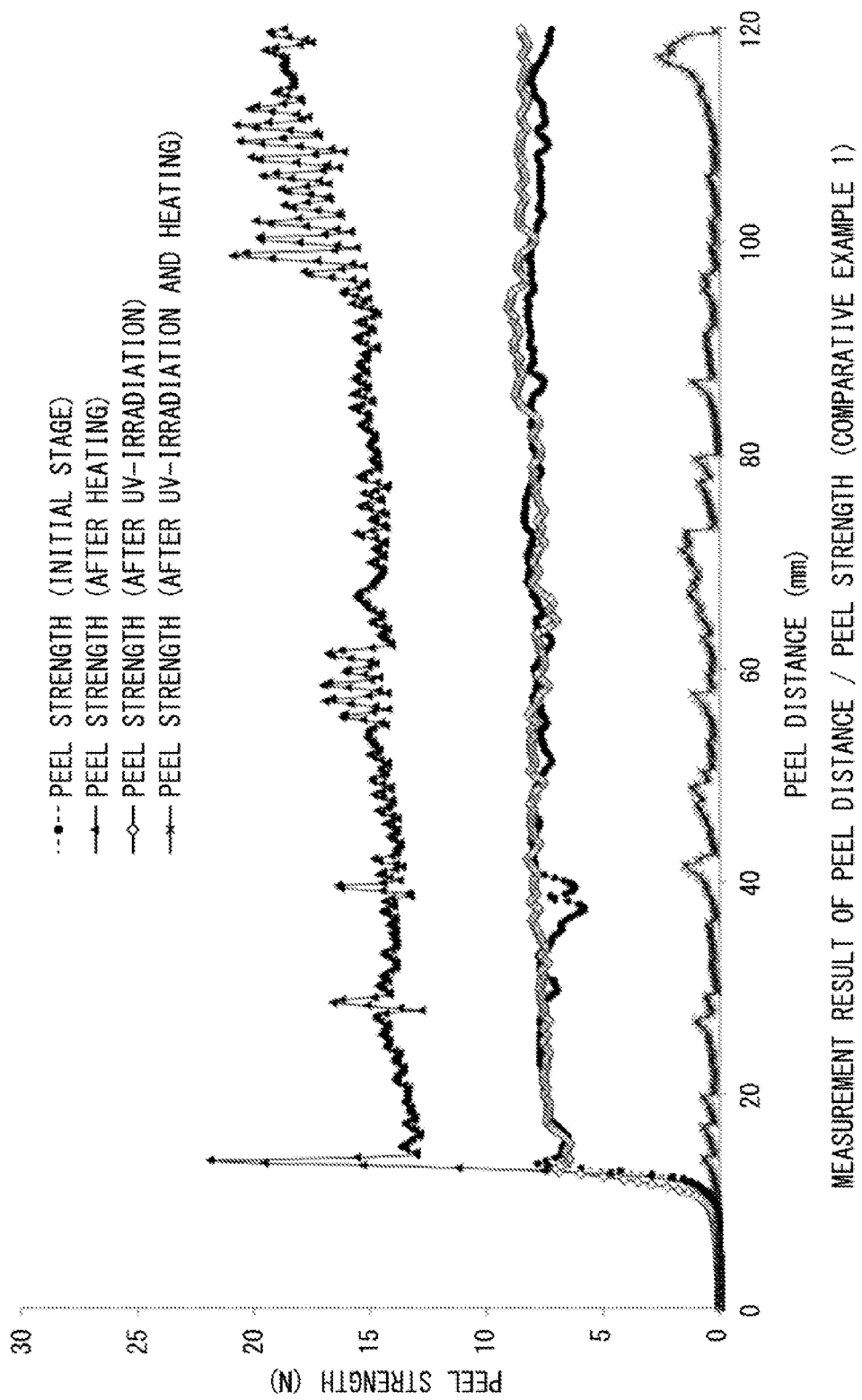
FIG. 4.

An adhesive composition was prepared in a similar manner to that of Example 1, except that the random copolymer (2) obtained in the Preparation Example 3 was used instead of the acrylic random copolymer (1). With respect to the obtained adhesive composition, the 180-degree peel strength thereof was measured in a similar manner to that of Example 1. The obtained results are shown in Table 1 and FIG. 4.

Example 4

Figure 5:
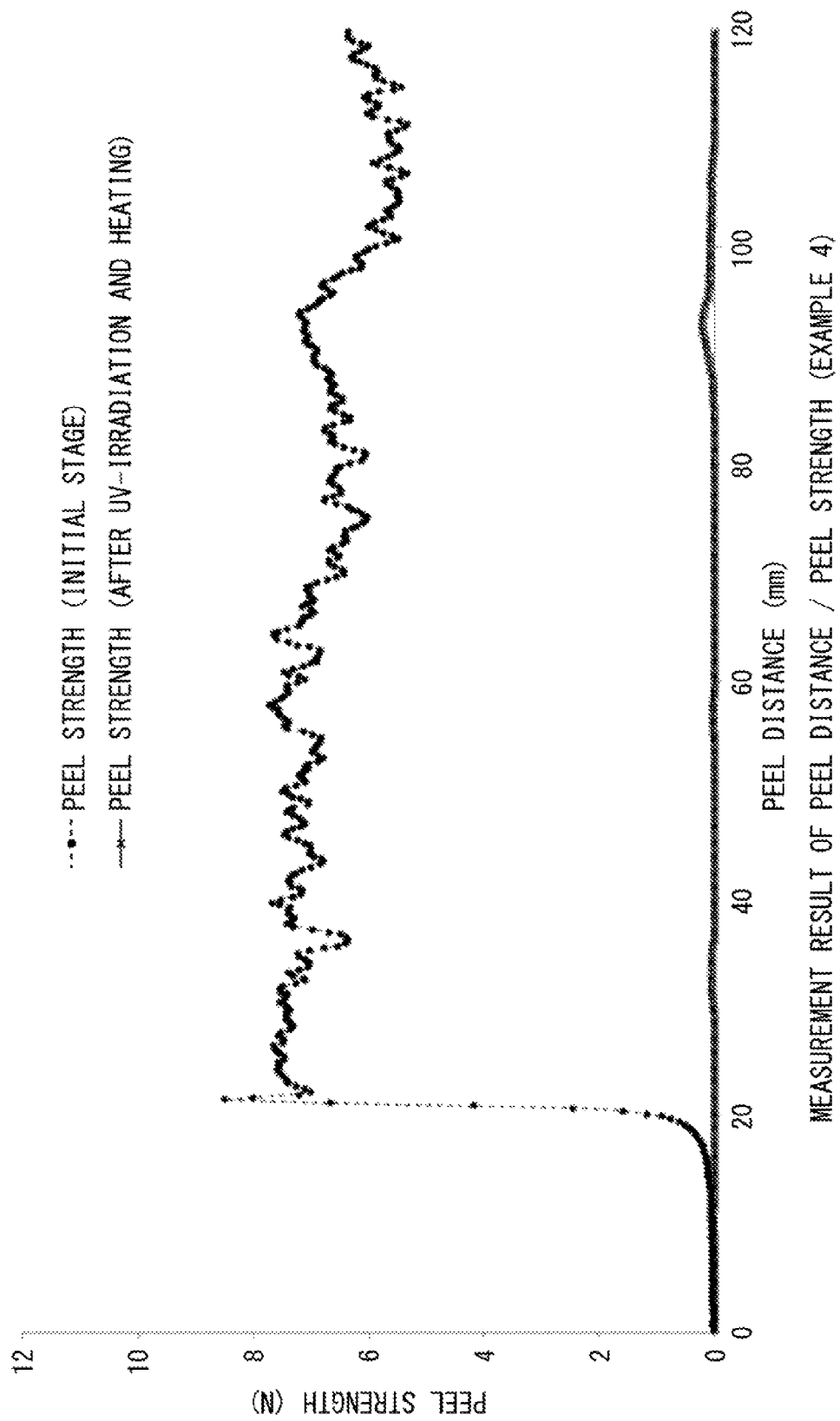
FIG. 5.

An adhesive composition was prepared in a similar manner to that of Example 1, except that the acrylic block copolymer (2) obtained in the Preparation Example 5 was used instead of the acrylic random copolymer (1). The obtained adhesive composition was used to prepare an adhesive sheet in a similar manner to that of Example 1, and the dismantling properties and adhesion properties thereof were evaluated. The obtained results are shown in Table 2 and FIG. 5.

Comparative Example 2

Figure 6:
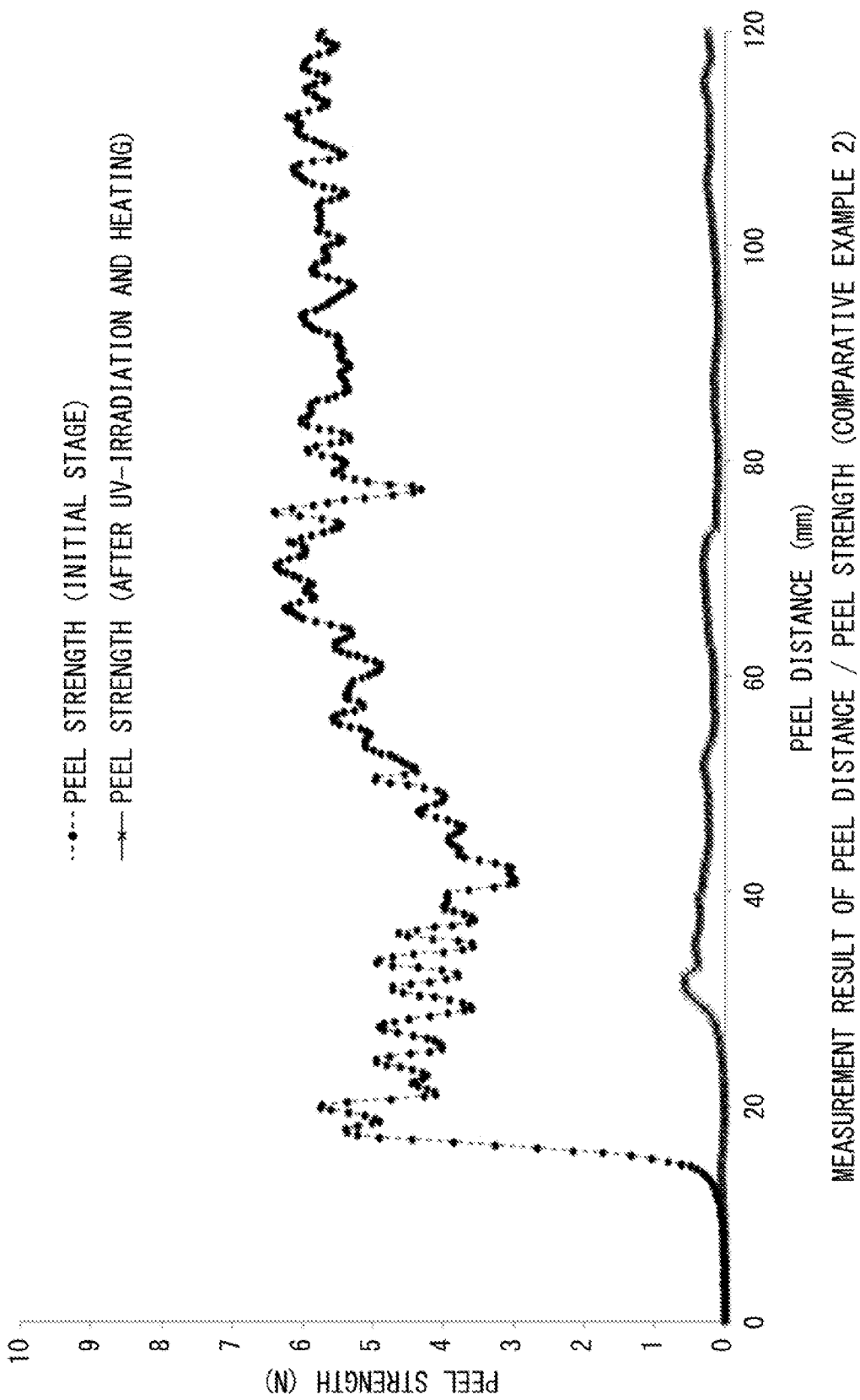
FIG. 6.

An adhesive composition was prepared in a similar manner to that of Example 1, except that the acrylic block copolymer (3) obtained in the Preparation Example 6 was used instead of the acrylic random copolymer (1). The obtained adhesive composition was used to prepare an adhesive sheet in a similar manner to that of Example 1, and the dismantling properties and adhesion properties thereof were evaluated. The obtained results are shown in Table 2 and FIG. 6.

<Dismantling Property Test>

The adhesive sheets prepared in Examples 1 to 3 and Comparative Example 1 were used to obtain 4 test pieces, respectively, the test pieces being prepared by cutting the adhesive sheets into rectangles, each having a width of 20 mm and a length of 175 mm, and then pressure-bonding the rectangles on SUS boards, each having a width of 50 mm, a length of 150 mm, and a thickness of 0.5 mm, at a temperature of 23° C. and at a humidity of 50%, by rolling a hand roller having a weight of 2 kg thereon back and forth, respectively.

One of the pressure-bonded test pieces was left still for 1 hour at a temperature of 23° C. and at a humidity of 50%, and then peeled off at a rate of 30 mm/minute using a peeling tester to measure the 180-degree peel strength thereof (initial stage).

One of the pressure-bonded test pieces was left still for 30 minutes at a temperature of 23° C. and at a humidity of 50%, heated for 1 hour at 100° C., and then left to cool to 23° C. or lower (approximately for 30 minutes) (heating).

One of the pressure-bonded test pieces was left still for 30 minutes at a temperature of 23° C. and at a humidity of 50%, exposed to ultraviolet-irradiation for 1 hour at room temperature, and then further left still for 30 minutes (UV irradiation).

One of the pressure-bonded test pieces was left still for 30 minutes at a temperature of 23° C. and at a humidity of 50%, exposed to ultraviolet-irradiation for 1 hour, heated at 100° C. for 1 hour, and then left to cool to 23° C. or lower (for approximately 30 minutes) (UV→heating).

The test pieces were peeled off at a rate of 30 mm/minute using a peeling tester to measure the 180-degree peel strength thereof. In the tables, mean values of peel strength values obtained when measured at a peel distance of 30 to 120 mm are indicated.

The ultraviolet-irradiation was performed with a laboratory mercury lamp manufactured by TOSHIBA CORPORATION under the name of "SHL-100UVQ-2" (75 W) as a light source, the light source being placed at a distance of 10 cm from the test pieces, by irradiating the test pieces with ultraviolet at least 15 minutes after the lamp was lit.

The adhesive sheets prepared in Example 4 and Comparative Example 2 were used to obtain 2 test pieces, respectively, the test pieces being prepared by cutting the adhesive sheets into rectangles, each having a width of 20 mm and a length of 175 mm, and then pressure-bonding the rectangles on SUS boards, each having a width of 50 mm, a length of 150 mm, and a thickness of 0.5 mm, at a temperature of 23° C. and at a relative humidity of 50%, by rolling a hand roller having a weight of 2 kg thereon back and forth, respectively.

One of the pressure-bonded test pieces was left still for 1 hour at a temperature of 23° C. and at a relative humidity of 50%, and then peeled off at a rate of 30 mm/minute using a peeling tester to measure the 180-degree peel strength thereof (initial stage).

One of the pressure-bonded test pieces was left still for 30 minutes at a temperature of 23° C. and at a relative humidity of 50%, exposed to ultraviolet-irradiation for 1 hour, heated at 100° C. for 1 hour, and then left to cool to 23° C. (for approximately 30 minutes) (UV→heating).

The test pieces were peeled off at a rate of 30 mm/minute using a peeling tester to measure the 180-degree peel strength thereof. In the tables, the mean value of peel strength values obtained when measured at a peel distance of 30 to 120 mm is indicated, and, in the case where stick-slip was detected, the amplitude thereof is indicated.

The ultraviolet irradiation was conducted using the same light source as mentioned above.

<Adhesion-property Test>

The adhesive sheets were used to prepare 2 test pieces by cutting the adhesive sheets into rectangles, each having a width of 20 mm and a length of 175 mm, and then pressure-bonding the rectangles on SUS boards, each having a width of 50 mm, a length of 150 mm, and a thickness of 0.5 mm, at a temperature of 23° C. and at a humidity of 50%, by rolling a hand roller having a weight of 2 kg thereon back and forth, respectively.

One of the pressure-bonded test pieces was left still for 1 hour at a temperature of 23° C. and at a humidity of 50%, and then peeled off at a rate of 300 mm/minute using a peeling tester to measure the 180-degree peel strength thereof (23° C.).

After one of the pressure-bonded test pieces was left still for 1 hour at a temperature of 23° C. and at a humidity of 50%, the test piece was left still for 10 minutes at a temperature of 70° C., and then peeled off at a rate of 300 mm/minute using a peeling tester to measure the 180-degree peel strength thereof (70° C.).

TABLE 1

|  |  | Ex. 1 | Ex. 2 | Ex. 3 | C. Ex. 1 |
| --- | --- | --- | --- | --- | --- |
| Copolymer form |  | random | block | random | random |
| Acrylic polymer | PtBA | 33.1 | 28.7 | 32.6 | 35.5 |
|  | co-PtBA |  | 4 |  |  |
|  | total PtBA | 33.1 | 32.7 | 32.6 | 35.5 |
|  | nBA | 53 | 52.3 | 50.8 | 60.8 |
|  | HEA | 13.9 | 14.9 | 16.6 | 3.7 |
| Molecular weight | Mw | 475000 | 570000 | 438700 | 463000 |
|  | Mw/Mn | 1.88 | 2.14 | 2.1 | 1.67 |
| Acid generator | NIT | 0.4 | 0.4 | 0.4 | 0.4 |
| Adhesive force N/20 mm | initial stage | 6.7 | 4.8 | 8.8 | 7.7 |
|  | heating | 18.7 | 16.5 | 9.6 (CF) | 16 (CF) |
|  | UV-irradiation | 8.9 | 11.2 | 9.7 (CF) | 8.1 |
|  | UV→heating | 0 | 0 | 0.26 (SS) | 0.55 (CF) |
| Adhesion test N/20 mm | 23° C. | 7 | 9.3 | 7.4 | 8.1 |
|  | 70° C. | 4.8 | 16 | 3.2 | 0.6 |

TABLE 2

|  |  | Ex. 4 | C. Ex. 2 |
| --- | --- | --- | --- |
| Copolymer form |  | block | block |
| Acrylic polymer | tBA | 23.2 | 37.9 |
|  | co-tBA | 4.7 | 5.4 |
|  | total tBA | 27.9 | 43.3 |
|  | nBA | 60.7 |  |
|  | 2EHA |  | 52.5 |
|  | HEA | 11.4 | 4.3 |
| Molecular weight | Mw | 304000 | 383000 |
|  | Mw/Mn | 1.6 | 1.49 |
| Acid generator | NIT | 0.4 | 0.4 |
| Adhesive force N/20 mm | initial stage | 6.6 | 5.6 |
|  | UV→heating | 0 | 0.2 (CF) |
| Adhesion test N/20 mm | 23° C. | 6.6 | 8 |
|  | 70° C. | 5.8 | 0.2 |

In the tables, values of each of the components in the acrylic polymer indicate molar ratios. Abbreviations indicated in the tables represent as follows. The abbreviation (CF)

in cells of adhesion force item represents that the cohesion failure of the adhesive agent layer occurred when delaminating was performed.

tBA: t-butyl acrylate forming a poly(t-butylacrylate) chain.

co-tBA: t-butyl acrylate contained in a polyacrylate chain to be copolymerized with a poly(t-butylacrylate) chain, the polyacrylate chain being composed of other copolymer components.

nBA: N-butyl acrylate

HEA: 2-hydroxyethyl acrylate

2EHA: 2-ethylhexyl acrylate

It is apparent from the above-shown tables that the adhesive compositions prepared in Examples 1 to 4 exhibited favorable adhesion properties and dismantling properties, and particularly exhibited excellent adhesion properties under high temperature. In addition, dismantling was performed without cohesion failure of the adhesive agent layer occurring, and interfacial delamination was easily realized. Among them, the adhesive compositions prepared in Examples 1, 2, and 4, could be delaminated without causing stick-slip when dismantled, and had particularly favorable dismantling properties. With respect to the adhesive composition prepared in Example 3, although cohesion failure occurred at a very small part of the peel distance, interfacial delamination was realized in almost all parts thereof. On the other hand, with respect to the adhesive composition prepared in Comparative Example 1, the adhesion force remained when dismantling was performed, and cohesion failure of the adhesive agent layer occurred. With respect to the adhesive composition prepared in Comparative Example 2, cohesion failure of the adhesive agent layer occurred.

INDUSTRIAL APPLICABILITY

An easily dismantlable adhesive composition according to the present invention enables easy dismantling using a simple method such as heating or light irradiation without adhesive remaining and deteriorating favorable adhesion properties derived from an acrylic polymer. In addition, when an adhesive tape is delaminated from an adherend or a substrate, an adhesive agent layer is interfacially delaminated with ease, and thereby remaining of the adhesive agent layer in the adherend or the substrate hardly occurs, and therefore the workability of performing dismantling is favorable. Therefore, the adhesive tape is favorably used to fix members, provisionally fix members, label product information, or the like, in various industrial fields, such as office automation equipment, IT—home electric appliances, automobiles, or the like, to be recycled or reused, without particular limitations, and enables easy dismantling using simple heating equipment, energy-line-irradiation equipment, or the like.

The invention claimed is:

1. An easily dismantlable adhesive composition comprising:
   an acrylic polymer; and
   either an acid catalyst or an acid generator,
   characterized in that the acrylic polymer comprises, as copolymer monomer components,
   a carboxyl-precursor-group-containing-(meth)acrylate monomer,
   an n-butyl acrylate, and
   a polar-group-containing monomer, and
   a content of the polar-group-containing monomer is 5 to 30% by mass, relative to a total mass of the monomer components composing the acrylic polymer.

2. The easily dismantlable adhesive composition according to claim 1, wherein the carboxyl-precursor-group-containing-(meth)acrylate monomer is at least one selected from the group consisting of tert-butyl (meth)acrylate, 2-methyl-2-adamantyl (meth)acrylate, 2-ethyl-2-adamantyl (meth)acrylate, bornyl (meth)acrylate, isobornyl (meth)acrylate, cyclohexyl (meth)acrylate, and benzyl (meth)acrylate.

3. The easily dismantlable adhesive composition according to claim 1, wherein the polar-group-containing monomer is a hydroxyl-group-containing-vinyl monomer.

4. The easily dismantlable adhesive composition according to claim 1, wherein a content of the carboxyl-precursor-group-containing-(meth)acrylate monomer is 1 to 75% by mass, relative to the total mass of the monomer components composing the acrylic polymer.

5. The easily dismantlable adhesive composition according to claim 1, wherein the acrylic polymer is an acrylic block polymer having: a poly(meth)acrylate chain (A) formed of the carboxyl-precursor-group-containing-(meth)acrylate monomer; and a poly(meth)acrylate chain (B) comprising, as monomer components, the n-butyl acrylate and the polar-group-containing monomer.

6. An easily dismantlable adhesive tape comprising an adhesive agent layer formed of an adhesive composition of claim 1.

7. The easily dismantlable adhesive composition according to claim 2, wherein the polar-group-containing monomer is a hydroxyl-group-containing-vinyl monomer.

8. The easily dismantlable adhesive composition according to claim 2, wherein a content of the carboxyl-precursor-group-containing-(meth)acrylate monomer is 1 to 75% by mass, relative to the total mass of the monomer components composing the acrylic polymer.

9. The easily dismantlable adhesive composition according to claim 3, wherein a content of the carboxyl-precursor-group-containing-(meth)acrylate monomer is 1 to 75% by mass, relative to the total mass of the monomer components composing the acrylic polymer.

10. The easily dismantlable adhesive composition according to claim 2, wherein the acrylic polymer is an acrylic block polymer having: a poly(meth)acrylate chain (A) formed of the carboxyl-precursor-group-containing-(meth)acrylate monomer; and a poly(meth)acrylate chain (B) comprising, as monomer components, the n-butyl acrylate and the polar-group-containing monomer.

11. The easily dismantlable adhesive composition according to claim 3, wherein the acrylic polymer is an acrylic block polymer having: a poly(meth)acrylate chain (A) formed of the carboxyl-precursor-group-containing-(meth)acrylate monomer; and a poly(meth)acrylate chain (B) comprising, as monomer components, the n-butyl acrylate and the polar-group-containing monomer.

12. The easily dismantlable adhesive composition according to claim 4, wherein the acrylic polymer is an acrylic block polymer having: a poly(meth)acrylate chain (A) formed of the carboxyl-precursor-group-containing-(meth)acrylate monomer; and a poly(meth)acrylate chain (B) comprising, as monomer components, the n-butyl acrylate and the polar-group-containing monomer.

13. An easily dismantlable adhesive tape comprising an adhesive agent layer formed of an adhesive composition of claim 2.

14. An easily dismantlable adhesive tape comprising an adhesive agent layer formed of an adhesive composition of claim 3.

15. An easily dismantlable adhesive tape comprising an adhesive agent layer formed of an adhesive composition of claim 4.

16. An easily dismantlable adhesive tape comprising an adhesive agent layer formed of an adhesive composition of claim 5.

\* \* \* \* \*